United States Patent
O'Connell et al.

(10) Patent No.: US 12,272,961 B2
(45) Date of Patent: Apr. 8, 2025

(54) TUNING RADIO FREQUENCY ELEMENTS

(71) Applicant: Nokia Technologies Oy, Espoo (FI)

(72) Inventors: Diarmuid O'Connell, Athy (IE);
Oliver Burns, County Meath (IE);
Nicholas Jeffers, Wicklow (IE); Ian Davis, Dublin (IE); Akshat Agarwal, Clonmagadden (IE)

(73) Assignee: NOKIA TECHNOLOGIES OY, Espoo (FI)

(*) Notice: Subject to any disclaimer, the term of this patent is extended or adjusted under 35 U.S.C. 154(b) by 567 days.

(21) Appl. No.: 17/321,762

(22) Filed: May 17, 2021

(65) Prior Publication Data

US 2021/0391751 A1    Dec. 16, 2021

(30) Foreign Application Priority Data

Jun. 15, 2020    (EP) ..................................... 20179966

(51) Int. Cl.
*H02J 50/10* (2016.01)
*H02J 7/02* (2016.01)

(52) U.S. Cl.
CPC ................ *H02J 50/10* (2016.02); *H02J 7/02* (2013.01)

(58) Field of Classification Search
CPC ................ H02J 50/10; H02J 7/02; H04B 5/79
See application file for complete search history.

(56) References Cited

U.S. PATENT DOCUMENTS

| | | | |
|---|---|---|---|
| 5,684,380 A * | 11/1997 | Woody | B60L 53/34 320/108 |
| 6,967,628 B2 * | 11/2005 | Rawnick | H01Q 9/16 343/789 |
| 8,742,991 B2 | 6/2014 | Soora | |
| 9,479,007 B1 | 10/2016 | Jol et al. | |
| 9,556,321 B2 | 1/2017 | Curry et al. | |
| 9,618,396 B1 | 4/2017 | Song et al. | |
| 2004/0227691 A1 | 11/2004 | Rawnick et al. | |
| 2004/0250994 A1 * | 12/2004 | Chordia | F28D 15/0266 257/E23.098 |

(Continued)

FOREIGN PATENT DOCUMENTS

| | | |
|---|---|---|
| JP | 2012228123 A * | 11/2012 |
| WO | 2004/097976 A1 | 11/2004 |

OTHER PUBLICATIONS

Konca et al., "A Frequency-reconfigurable Antenna Architecture Using Dielectric Fluids", IEEE Transactions on Antennas and Propagation, vol. 63, No. 12, Dec. 2015, pp. 5280-5286.

(Continued)

*Primary Examiner* — Richard Isla
*Assistant Examiner* — Johali A Torres Ruiz
(74) *Attorney, Agent, or Firm* — ALSTON & BIRD LLP (57) ABSTRACT

Aspects of the present disclosure may relate to an apparatus, a method, and non-transitory computer-readable storage medium configured for tuning radio frequency elements. In some aspects, the aspects may relate to at least one radio frequency element, at least one wireless charging, one or more channels configured to run between a first portion at least substantially adjacent to the at least one wireless charging coil and a second portion at least substantially adjacent to the at least one radio frequency element, and a dielectric fluid disposed within the one or more channels.

9 Claims, 9 Drawing Sheets

(56) References Cited

U.S. PATENT DOCUMENTS

| | | | |
|---|---|---|---|
| 2004/0264107 A1* | 12/2004 | Hunt | H01G 5/0132 361/327 |
| 2009/0266520 A1* | 10/2009 | Yu | G06F 1/203 165/104.21 |
| 2012/0004650 A1 | 1/2012 | Shiu et al. | |
| 2012/0068801 A1* | 3/2012 | Duwel | H01Q 3/44 336/20 |
| 2013/0116679 A1* | 5/2013 | Van der Weide | A61B 17/320068 606/33 |
| 2014/0216714 A1* | 8/2014 | Dittmer | E21B 17/028 166/57 |
| 2015/0013985 A1 | 1/2015 | Parsche | |
| 2017/0229909 A1* | 8/2017 | Peng | F25B 21/02 |
| 2017/0295676 A1 | 10/2017 | Conn et al. | |
| 2018/0019049 A1 | 1/2018 | Lazarus et al. | |
| 2018/0254136 A1* | 9/2018 | Ueda | H01F 27/28 |
| 2019/0121407 A1 | 4/2019 | Lee et al. | |
| 2019/0333676 A1 | 10/2019 | Shin et al. | |
| 2021/0135501 A1* | 5/2021 | Pan | H02J 7/0042 |

OTHER PUBLICATIONS

Parchin et al., "Reconfigurable Antennas: Switching Techniques—A Survey", Electronics, vol. 9, No. 2, 2020, pp. 1-14.

Kelley et al., "Frequency Reconfigurable Patch Antenna using Liquid Metal as Switching Mechanism", Electronics Letters, vol. 49, No. 22, Oct. 24, 2013, pp. 1370-1371.

Li et al., "A Tunable Wideband Liquid Antenna", 16th Mediterranean Microwave Symposium (MMS), Nov. 14-16, 2016, 4 pages.

Extended European Search Report received for corresponding European Patent Application No. 20179966.5, dated Sep. 11, 2020, 8 pages.

Office Action for European Application No. 20179966.5 dated Mar. 14, 2024, 5 pages.

* cited by examiner

TUNING RADIO FREQUENCY ELEMENTS

BACKGROUND

In wireless telecommunications systems, such as Long-Term Evolution or 5$^{th}$ generation (5G) systems, smartphones and wearable devices (e.g., smart watches or activity trackers) may be generally referred to as user equipment (UE). In LTE or 5G systems, a UE may communicate with base stations (which may also be referred to as Node Bs or evolved Node Bs (eNBs)) to allow for connectivity between the user equipment (UE) and the core network.

In many devices, wireless charging is implemented as a way to charge the device. In some cases, wireless charging can generate heat, and heat dissipation techniques are helpful to promote healthy operation. Further, as many UEs have radio frequency elements configured for wireless communication, tuning of those radio frequency elements may be useful.

BRIEF SUMMARY

One aspect of the present disclosure relates to an apparatus configured for tuning radio frequency elements. In some aspects, the apparatus may include at least one radio frequency element, at least one wireless charging coil, one or more channels configured to run between a first portion at least substantially adjacent to the at least one wireless charging coil and a second portion at least substantially adjacent to the at least one radio frequency element.

In some aspects, the apparatus may also comprise a means for triggering provision of a direct current on the at least one wireless charging coil. The provision of the direction current on the at least one wireless charging coil may be configured to initiate movement of the dielectric fluid in the one or more channels between the first portion and the second portion. The movement of the dielectric fluid between the first portion at least substantially adjacent to the at least one wireless charging coil and the second portion at least substantially adjacent to the at least one radio frequency element is configured to change one or more radio frequency characteristics of the at least one radio frequency element. The change of one or more radio frequency characteristics may be configured to tune the at least one radio frequency element In some aspects, the first portion the first portion comprises a reservoir configured to dispose the dielectric fluid, and the second portion comprises a porous material substantially adjacent to the radio frequency element configured to receive the dielectric fluid.

In some aspects, the one or more channels may be configured to dissipate heat via movement of the dielectric fluid through the one or more channels between the first portion and the second portion. The apparatus may be, in some cases, further configured to include a radio frequency element array, wherein the radio frequency element is one of a plurality of radio frequency elements in the radio frequency element array, and wherein the one or more channels are configured to run between the first portion and the second portion.

In another aspect of the present disclosure, a method for tuning a radio frequency element is disclosed. The method may include providing a direct current associated with a magnetic field to dielectric fluid disposed within one or more channels at least comprising a first portion substantially adjacent to at least one wireless charging coil. The method may also include moving the dielectric fluid between the first portion and a second portion of the one or more channels at least substantially adjacent to at least one radio frequency element as a result of the provided direct current.

In some aspects, the moving the dielectric fluid from the wireless charging coil to the radio frequency element is configured to tune the radio frequency element. Further, in some cases, the provision of direct current to the wireless charging coil may be triggered by detecting interference of transmissions received and/or transmitted at the radio frequency element. The interference may, in some cases, be based on one or more of hand position of a user of an apparatus comprising the one or more channels and the radio frequency element, speed of travel of the apparatus, traffic associated with a radio frequency channel used in the transmission with the radio frequency element, or any suitable combination thereof.

In another aspect of the present disclosure, a non-transitory computer-readable storage medium, the computer-readable storage medium including instructions that when executed by a processor, cause the processor to perform operations. For example, the instructions may include providing a direct current associated with a magnetic field to dielectric fluid disposed within one or more channels at least comprising a first portion substantially adjacent to at least one wireless charging coil, and moving the dielectric fluid between the first portion and a second portion of the one or more channels at least substantially adjacent to at least one radio frequency element as a result of the provided direct current.

DETAILED DESCRIPTION

It will be readily understood that the components of the present disclosure, as generally described and illustrated in the figures herein, may be arranged and designed in a wide variety of different configurations. Thus, the following detailed description of the aspects of systems, methods, apparatuses, and computer program products for inferring the stress valence of an individual from sensor data, is not intended to limit the scope of the present disclosure but is representative of selected aspects of the present disclosure.

The features, structures, or characteristics of the present disclosure described throughout this specification may be combined in any suitable manner in one or more aspects. For example, the usage of the phrases "certain aspects," "some aspects," or other similar language, throughout this specification refers to the fact that a particular feature, structure, or characteristic described in connection with the aspect may be included in at least one aspect of the present disclosure. Thus, appearances of the phrases "in certain aspects," "in some aspects," "in other aspects," or other similar language, throughout this specification do not necessarily all refer to the same group of aspects, and the described features, structures, or characteristics may be combined in any suitable manner in one or more aspects.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and aspects of this present disclosure, and not in limitation thereof.

As introduced above, one aspect is directed to using one or more channels between a wireless charging coil and a radio frequency element to tune one or more radio frequency characteristics of the radio frequency element. In general, the thermomagnetic effect describes a phenomenon where the magnetization of a dielectric fluid is temperature dependent. When a temperature difference exists in a dielectric fluid a difference in magnetization also exists and if this dielectric fluid is subjected to a magnetic field a net driving force exists—applying a stronger force on the more strongly magnetized particles and a weaker force to the weaker magnetized particles. Consequently, subjecting dielectric fluid to both a temperature difference and a magnetic field induces a moving force on the dielectric fluid. The aspects described herein relate to applying this thermodynamic effect in the aspects discussed herein.

Figure 1:
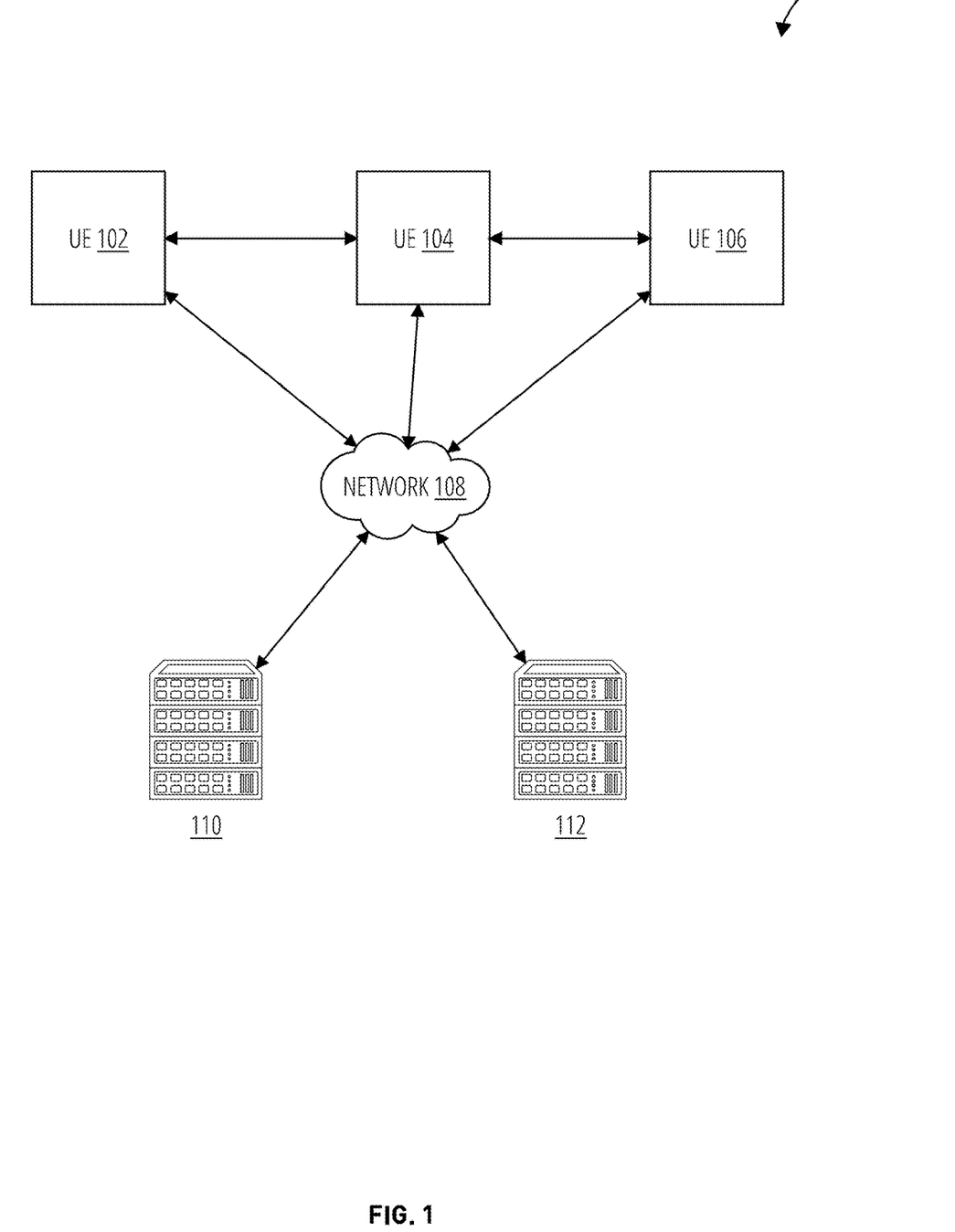
FIG. 1 illustrates a System according to one aspect of the present disclosure.

FIG. 1 illustrates a System 100 according to one aspect of the present disclosure. In the example of FIG. 1, System 100 may include one or more user equipment (UE) devices such as UE 102, UE 104, UE 106, communicatively coupled to a network 108. The network 108 may be a radio access network, such as LTE or 5G, a local area network (LAN), a wide area network (WAN) such as the Internet, or wireless LAN (WLAN), for example. As illustrated in the example of FIG. 1, one or more UE(s) 102, 104, 106, may be configured to communicate with the network 108 via wireless or wired connections. In an addition, in an aspect, the UE 102, UE 104, and/or UE 106 may be configured to communicate directly with each other via wireless or wired connections. Examples of UE(s) 102, 104, 106 may include, but is not limited to, smartphones, wearable devices, tablets, laptop computers, desktop computers, or other mobile or stationary device. In an aspect, System 100 may also include one or more hosts or servers 110, 112 connected to the network 108 through wireless or wired connections. According to one aspect, servers 110, 112 may be implemented in or function as base stations (which may also be referred to as Node Bs or evolved Node Bs (eNBs)) eNBs. In other aspects, servers 110, 112 may include web servers, mail servers, application servers, etc. According to certain aspects, servers 110, 112 may be standalone servers, networked servers, or an array of servers.

Figure 2:
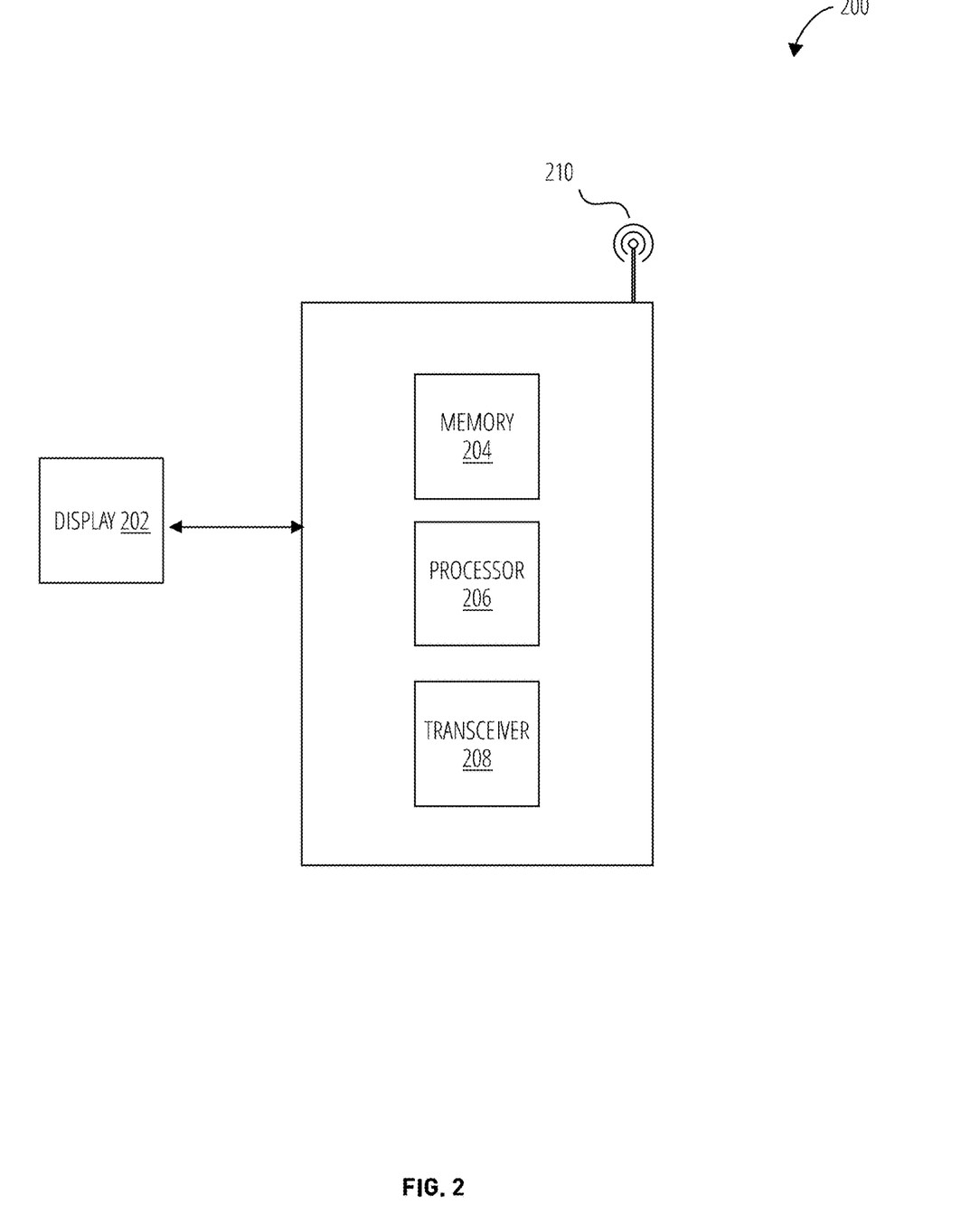
FIG. 2 illustrates an example of an apparatus according to an aspect of the present disclosure.

FIG. 2 illustrates an example of a UE or apparatus 200 according to an aspect. In an aspect, apparatus 200 may be a node or element in a communications network or associated with such a network, such as a mobile device, smartphone, wearable device, tablet computer, laptop computer, Internet of Things (IoT) device, or other mobile or stationary device. As described herein, apparatus 200 200 may alternatively be referred to as, for example, a UE, mobile station, mobile equipment, mobile unit, mobile device, user device, subscriber station, wireless terminal, tablet, smartphone, wearable device, IoT device, or the like. As one example, apparatus 200 may be implemented in, for instance, a wireless handheld device, a wireless wearable device, a wireless plug-in accessory, or any combination thereof. In one example, apparatus 200 may correspond to one or more of the UE(s) 102, 104, 106, depicted in FIG. 1 discussed above. It should be noted that one of ordinary skill in the art would understand that apparatus 200 may include components or features not shown in FIG. 2.

As illustrated in FIG. 2, apparatus 200 may include at least one processor 206 for processing information and executing instructions or operations. The processor 206 may be any type of general or specific purpose processor. While a single processor 206 is shown in FIG. 2, multiple processors may be utilized according to other aspects. In fact, the processor 206 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In some cases, the processor 206 may be remote from the apparatus 200 200, such as disposed within a server like one or more of the servers 110, 112 of FIG. 1.

The processor 206 may perform functions associated with the operation of apparatus 200 which may include, for example, precoding of antenna gain/phase parameters, encoding and decoding of individual bits forming a communication message, formatting of information, and overall control of the apparatus 200, including processes related to management of communication resources.

Apparatus 200 may further include or be coupled to at least one memory 204 (internal or external), which may be coupled to the processor 206, for storing information and instructions that may be executed by the processor 206. The memory 204 may include non-transitory computer-readable storage medium, the computer-readable storage medium including instructions that when executed by a processor, cause the processor to carry out instructions, or method steps. The memory 204 may be one or more memories and of any type suitable to the local application environment, and may be implemented using any suitable volatile or nonvolatile data storage technology such as a semiconductor-based memory device, a magnetic memory device and System, an optical memory device and System, fixed memory, and removable memory. For example, memory 204 can be comprised of any combination of random-access memory (RAM), read only memory (ROM), static storage such as a magnetic or optical disk, hard disk drive (HDD), or any other type of non-transitory machine or computer readable media. The instructions stored in memory 204 may include program instructions or computer program code that, when executed by processor 206, enable the Apparatus 200 to perform tasks as described herein.

In some aspects, apparatus 200 may also include or be coupled to at least one antenna 210 for transmitting and receiving signals and/or data to and from apparatus 200.

Apparatus 200 may further include or be coupled to a transceiver 208 configured to transmit and receive information. The transceiver 208 may include, for example, a plurality of radio interfaces that may be coupled to the antenna 210. The radio interfaces may correspond to a plurality of radio access technologies including one or more of LTE, 5G, WLAN, Bluetooth, near field communication (NFC), radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 208 may be configured to modulate information on to a carrier waveform for transmission by the antenna 210 and demodulate information received via the antenna(s) 210 for further processing by other elements of apparatus 200. In other aspects, transceiver 208 may be capable of transmitting and receiving signals or data directly.

Apparatus 200 may further include a display 202, such as a touchscreen, which may include a user interface, such as a graphical user interface. In certain aspects, display 202 may be configured to display information or data to a user of apparatus 200. Display 202 may also be configured to receive input from a user of apparatus 200 via a touchscreen, for example.

In an aspect, at least one memory 204 may store software modules that provide functionality when executed by processor 206. The modules may include, for example, an operating System that provides operating System functionality for apparatus 200. The memory 204 may also store one or more functional modules, such as an application or program, to provide additional functionality for apparatus 200. The components of apparatus 200 may be implemented in hardware, or as any suitable combination of hardware and software.

In one aspect, apparatus 200 may be a UE, mobile station, mobile equipment, mobile unit, mobile device, user device, subscriber station, wireless terminal, tablet, smartphone, wearable device, IoT device, for example. According to certain aspects, apparatus 200 may be controlled by memory 204 and processor 206 to perform the functions associated with aspects described herein. For example, in an aspect, apparatus 200 may be controlled by memory 204 and processor 206 provide direct current associated with a magnetic field to dielectric fluid disposed within one or more channels at least comprising a first portion substantially adjacent to at least one wireless charging coil, and move the dielectric fluid between the first portion and a second portion of the one or more channels at least substantially adjacent to at least one radio frequency element as a result of the provided direct current, as discussed in more detail below.

Figure 3:
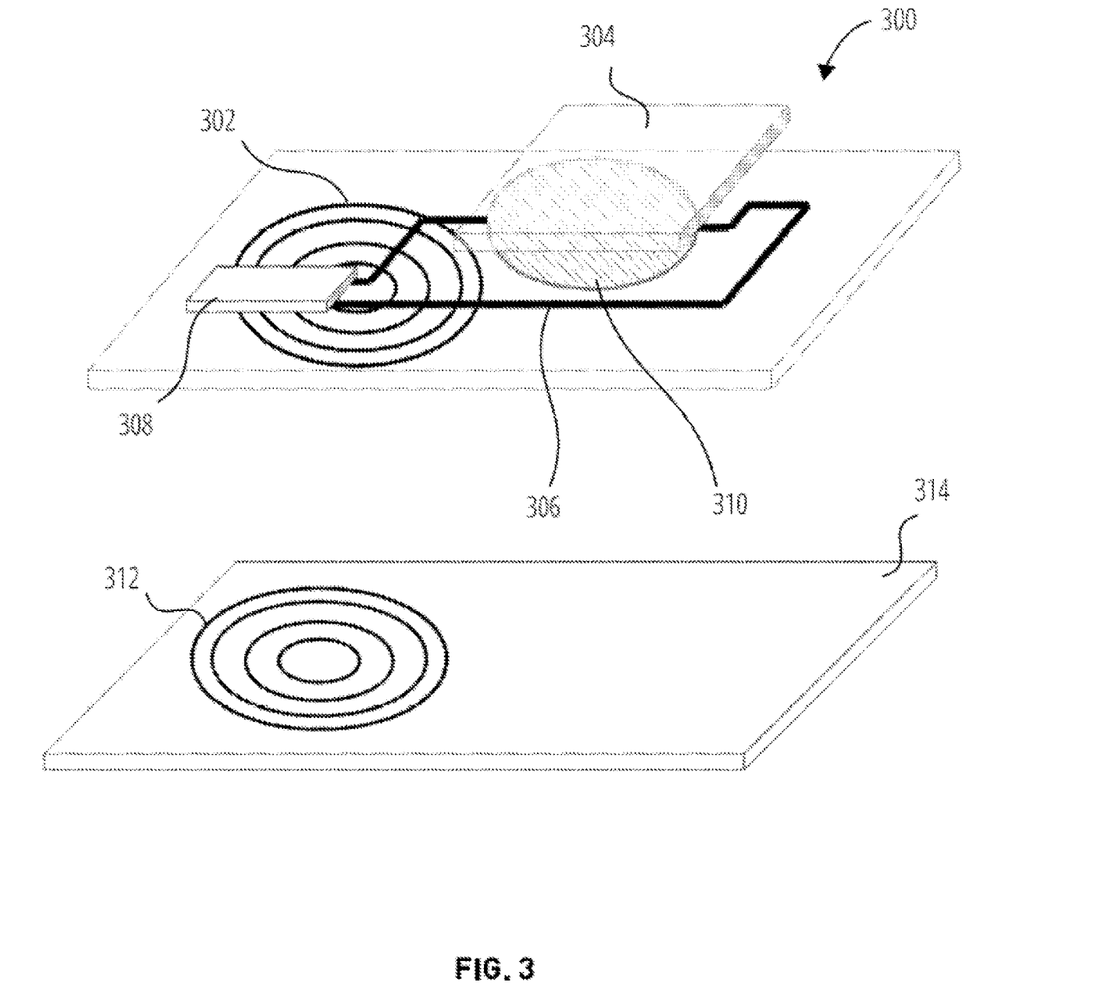
FIG. 3 illustrates at least one wireless charging coil and a radio frequency element according to an aspect of the present disclosure.

FIG. 3 illustrates an arrangement 300 including at least one wireless charging coil 302 and at least one radio frequency element 304. In some cases, the radio frequency element 304 may be an antenna, such as the antenna 210 of the apparatus 200. As shown in FIG. 3, the radio frequency element 304 may be a patch antenna. One or more channels 306 may be configured to run between the radio frequency element 304 and the wireless charging coil 302. The presence of the dielectric fluid near the radio frequency element 304 may change the one or more radio frequency characteristics of the radio frequency element 304.

A dielectric fluid may be disposed within a reservoir 308 defining a first portion one or more channels 306. The reservoir 308 may be considered a part of the one or more channels 306, or a separate component coupled to the one or more channels 306. The reservoir 308 may be adjacent to the wireless charging coil 302. Characteristics of a magnetic field associated with the wireless charging coil 302 may initiate movement of the dielectric fluid from the wireless charging coil 302 to the radio frequency element 304 via the one or more channels 306. A porous material 310, defining a second portion of the one or more channels 306, may be configured to be disposed adjacent to the radio frequency element 304. The porous material 310 may be considered a part of the one or more channels 306, or a separate component coupled to the one or more channels 306. In either case, the porous material 310 may be configured to receive the dielectric fluid. As discussed in more detail below, the characteristics of the porous material 310 as well as the flow of the dielectric fluid may tune characters of the radio frequency element 304. In some cases, the amount of dielectric fluid can be controlled by valves or individual cooling elements for each channel to control the thermo-magnetic effect of the dielectric fluid within the porous material 310, and the associated changes of one or more radio frequency characteristics of the radio frequency element 304.

As discussed herein, the term "adjacent" as used in herein, and reference to the first portion or reservoir 308, the second portion or porous material 310, the one or more channels 306, may be defined as immediately advanced or substantially adjacent, or not immediately adjacent. In any case, the term adjacent may therefore refer to being disposed within a range of a respective component such that one component's electrical, electromagnetic, radio frequency properties, and the like may affect that of another. For example, in the case of the reservoir 308, the term adjacent may refer to an arrangement wherein the reservoir 308 is within a range of a magnetic field associated with a direct current of the wireless charging coil 302. As another example, in the case of the porous material 310, adjacent may refer to an arrangement wherein the dielectric fluid when within the porous material 310 is close enough to affect the one or more radio frequency characteristics of the radio frequency element 304.

In some aspects, the wireless charging coil 302 may generate heat during wireless charging operations. A dielectric fluid configured to be disposed within a reservoir 308 may be configured to dissipate heat from the wireless charging coil 302 by movement of the dielectric fluid from the wireless charging coil 302 to the radio frequency element 304. The dielectric fluid may be a fluid configured to react to the presence of a magnetic field, such as a ferrofluid. As discussed in more detail herein, the dielectric fluid may be configured to react to a direct current applied to the wireless charging coil 302.

In some aspects, tuning of one or more radio frequency characteristics of the radio frequency element 304 may be done in response to changing environments. For example, in some cases, the radio frequency element 304 may incur interference on a given channel of communication. In this scenario, the dielectric fluid may be provided from the wireless charging wireless charging coil 302 to the porous material 310 to change one or more radio frequency characteristics of the radio frequency element 304. As another example, a user of the apparatus 200 may hold the apparatus 200 in a position that blocks communication via the antenna 210. In this scenario, the tuning of the one or more radio frequency characteristics may be used to account for the hand position. As yet another example, the apparatus 200 may be traveling at high speeds in an automobile, train, airplane, and the like. In this scenario, tuning of the one or more radio frequency characteristics may be used to account for the speed of travel.

In some cases, the wireless charging coil 302 may be configured to be coupled to a transmission coil 312 of wireless charging apparatus 314 during wireless power transfer. An electromagnetic field, magnetic field, or any combination thereof associated with the transmission coil 312 may be configured to impinge and/or couple with the wireless charging coil 302 of the apparatus. In this case, the wireless charging coil 302 is a receiving coil of wireless power transfer. The wireless charging apparatus 314 may be, for example, a wireless charger such as a wireless charging pad, including a transmitting coil for transmission of wireless power.

Figure 4:
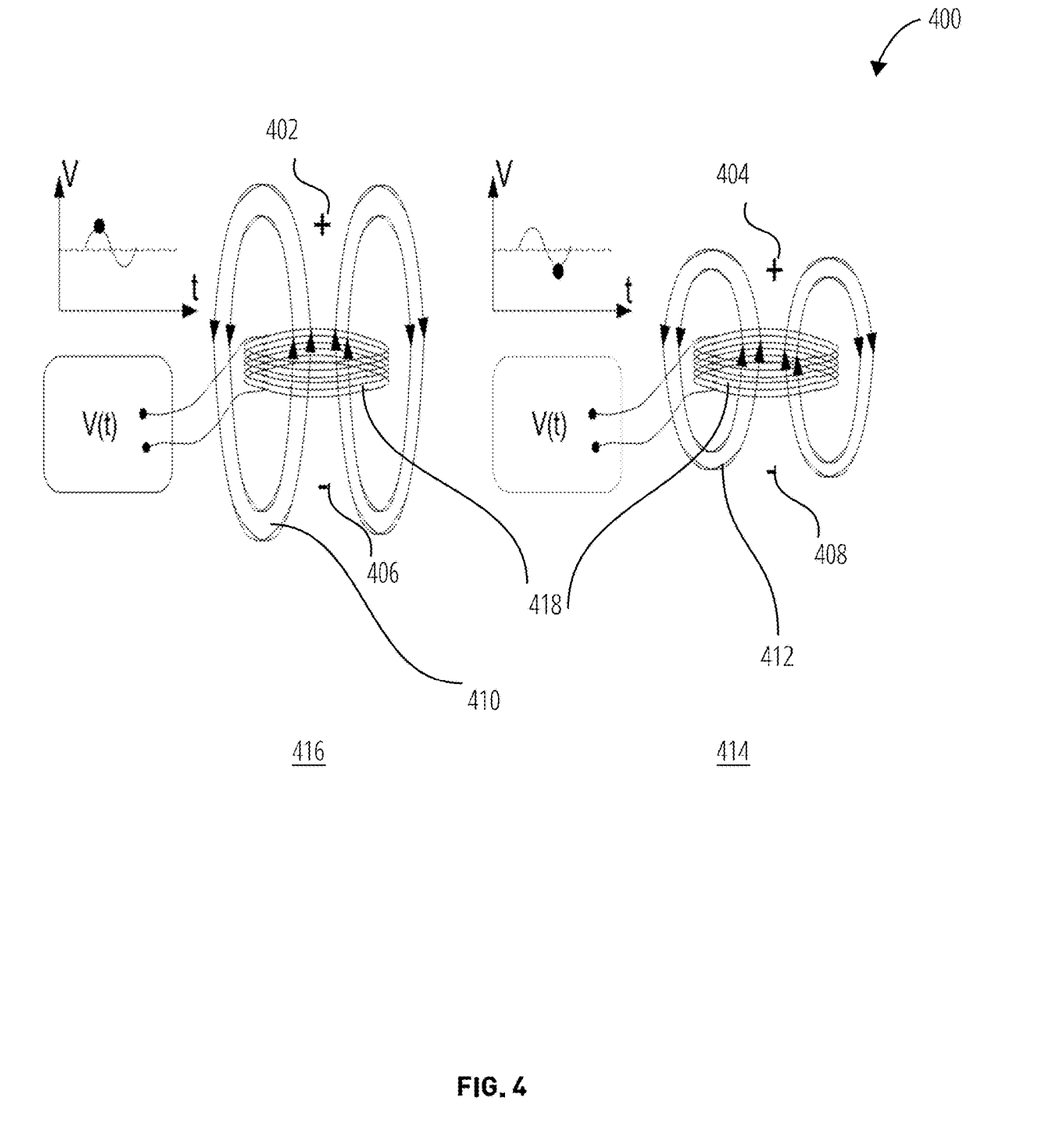
FIG. 4 illustrates a direct current provided to a wireless charging coil according to an aspect of the present disclosure.

FIG. 4 illustrates a direct current provided to a wireless charging coil, such as the wireless charging coil 302 of FIG. 3. While the apparatus 200 is undergoing wireless charging, a varying magnetic field is applied to the wireless charging coil 302 which in turn may apply an alternating force on the dielectric fluid. As the alternating force will act in opposite directions, the resulting movement of the dielectric fluid may be minimal. Therefore, in some aspects, a direct current 400 may be provided to the wireless charging coil 302 and/or directly to the dielectric fluid as a result of direct current operation discussed in more detail below. In this aspect, the direct current 400 may be used to implement a uni-directional flow of the dielectric fluid from the wireless charging coil 302 to the radio frequency element 304. In further aspects, the direct current 400 may be provided to the wireless charging coil 302 either during wireless charging or when the device is not undergoing wireless charging.

As illustrated in FIG. 4, the direct current 400 may be uni-directional, and the polarities including positive polarities 402, 404, 406, and 408, remain constant within two different magnitudes 410, 412 of the direct current 400. In other words, as magnitude of the provided direct current 400 vary, so does the intensity of an associated magnetic field. The wireless charging coil 302 may be configured to receive a varying magnetic field during wireless charging. However, a force provided by the direct current 400 via the wireless charging coil 302 may result in a force on the dielectric fluid which may be unidirectional. Therefore, flow of the dielectric fluid from the wireless charging coil 302 to the radio frequency element 304 may occur when the apparatus 200 is not being charged.

In some cases, the direct current may be provided by changing a magnitude, such as from magnitude 410 to magnitude 412, of a magnetic field while keeping the direction of the magnetic field the same, or substantially the same within an assigned threshold. In some cases, the magnetic field is associated with a transmitting coil, such as the transmitting coil 312 of a wireless charging apparatus 314 of FIG. 3, rather than being associated with a receiving coil, such as the wireless charging coil 302. As discussed above, the wireless charging apparatus 314 may be configured to electromagnetically couple to the wireless charging coil 302 of the apparatus 200 via the transmission coil 312 of the wireless charging apparatus 315. In FIG. 4, coil 414 may represent either the transmitting coil 312 of the wireless charging apparatus 314, or a receiving coil, such as the wireless charging coil 302 of apparatus 200. When representing the transmitting coil 312, for example, and when the apparatus 200 is receiving wireless power via the wireless charging coil 302 from transmitting coil 312 of the wireless charging apparatus 314, the wireless transmission of power the transmitting coil 312 may generate a magnetic field configured to be received at a receiving coil, such as the wireless charging coil 302 of FIG. 3. In aspects of the present disclosure, the magnitude of the magnetic field of the transmitting coil 312 can be increased while the direction of the magnetic field is unchanged. In some cases, the change of the magnitude of the magnetic field associated with the transmitting coil 312's transmission of wireless power while the direction associated with the same magnetic field is unchanged, or substantially unchanged within a predetermined ranged, may be referred to as direct current operation wherein movement of the dielectric fluid in one or more channels 306 is initialized as a result. In this aspect and others, the direct current operation during transmission of wireless power as discussed herein may result in movement of the dielectric fluid within the one or more channels 306 as well as wireless power transfer from the transmitting coil 312 to the wireless charging coil 302. In some cases, the direct current operation may be triggered by a processor, such as the processor 206, or a processor within wireless charging apparatus 314 associated with the transmitting coil 312. In some cases, when coil 414 of FIG. 4 represents a receiving coil, such as the wireless charging coil 302 of FIG. 3, the direct current operation is applied to the wireless charging coil 302 such that direction of a magnetic field associated the wireless charging coil 302, of the apparatus 200 is unchanged, or substantially unchanged within a threshold, while the magnitude is changed resulting in movement of the dielectric fluid through the one or more channels 306 when the apparatus 200 is not receiving any wireless power transfer from a coupling of the transmitting coil 312 and the wireless charging coil 302 of the apparatus 200. When the coil 414 of FIG. 4 represents a receiving coil, such as the wireless charging coil 302, the direct current may be triggered by the processor 206 of the apparatus 200.

Figure 5:
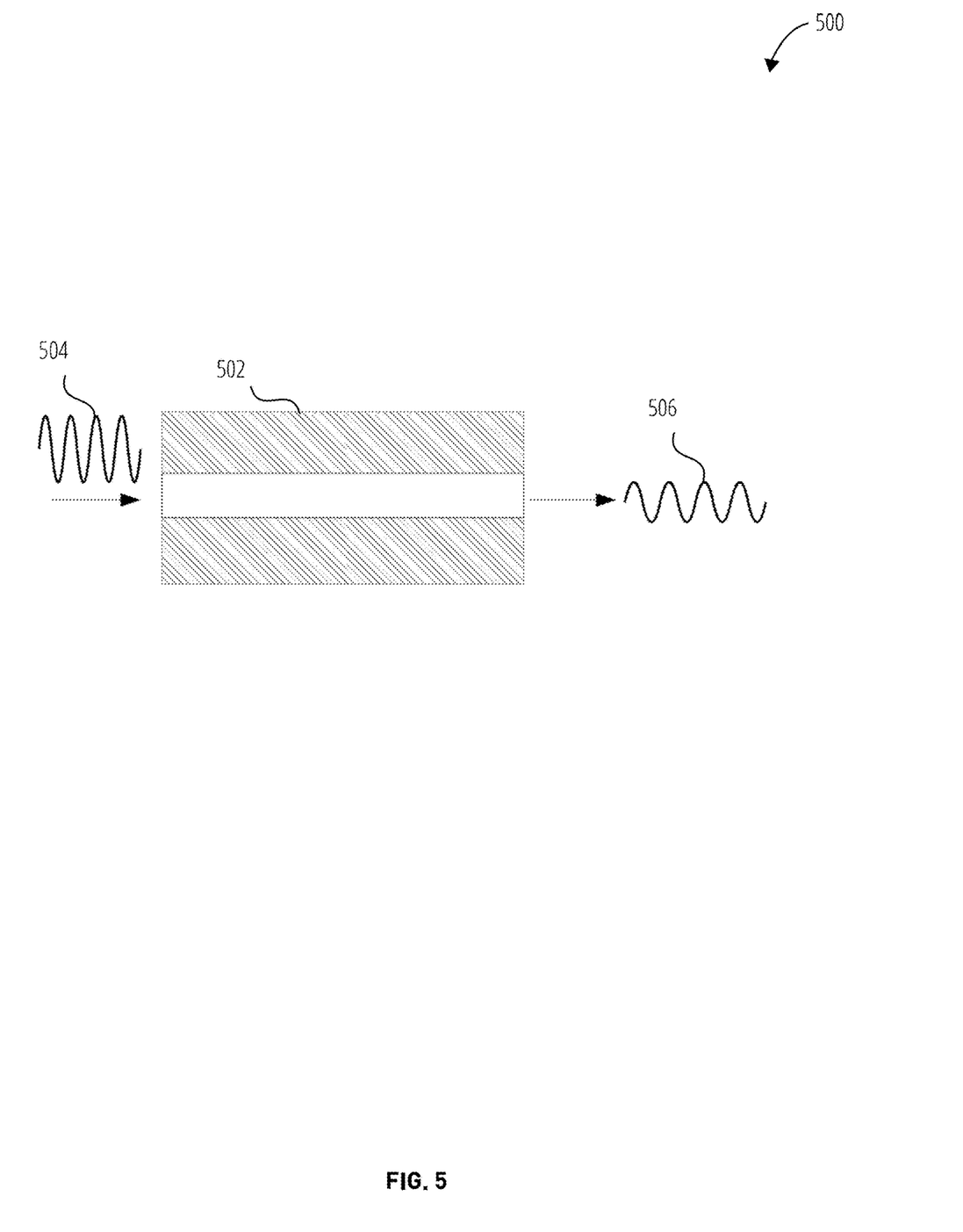
FIG. 5 illustrates a thermodynamic effect of a transmission line according to an aspect of the present disclosure.

FIG. 5 illustrates a thermodynamic effect related to aspects discussed herein. As discussed previously, subjecting dielectric fluid to both a temperature difference and a magnetic field induces a moving force on the dielectric fluid. As illustrated in FIG. 5, characteristics of radio frequency components and/or devices, such as the radio frequency element 304 of FIG. 3, may be determined by dielectric material properties, such as properties of the dielectric fluid discussed herein. For example, the dielectric constant and tangent loss of the dielectric material may impact signal velocity and signal losses in electrical transmission lines. FIG. 5 illustrates a transmission line 500 that is impacted by the presence of a material 502, such as the porous material 310, when the dielectric fluid discussed herein is present. As illustrated, an incoming signal 504 having a first characteristic may be altered after passing through the material 502, resulting in an altered signal 506. In other words, tuning of the radio frequency element 304 may be the result of dielectric fluid within the porous material 310. Although porous material 310 is discussed herein, any suitable material may be used such that the dielectric fluid can alter one or more radio frequency characteristics of a radio frequency element, such as the radio frequency element 304.

Figure 6:
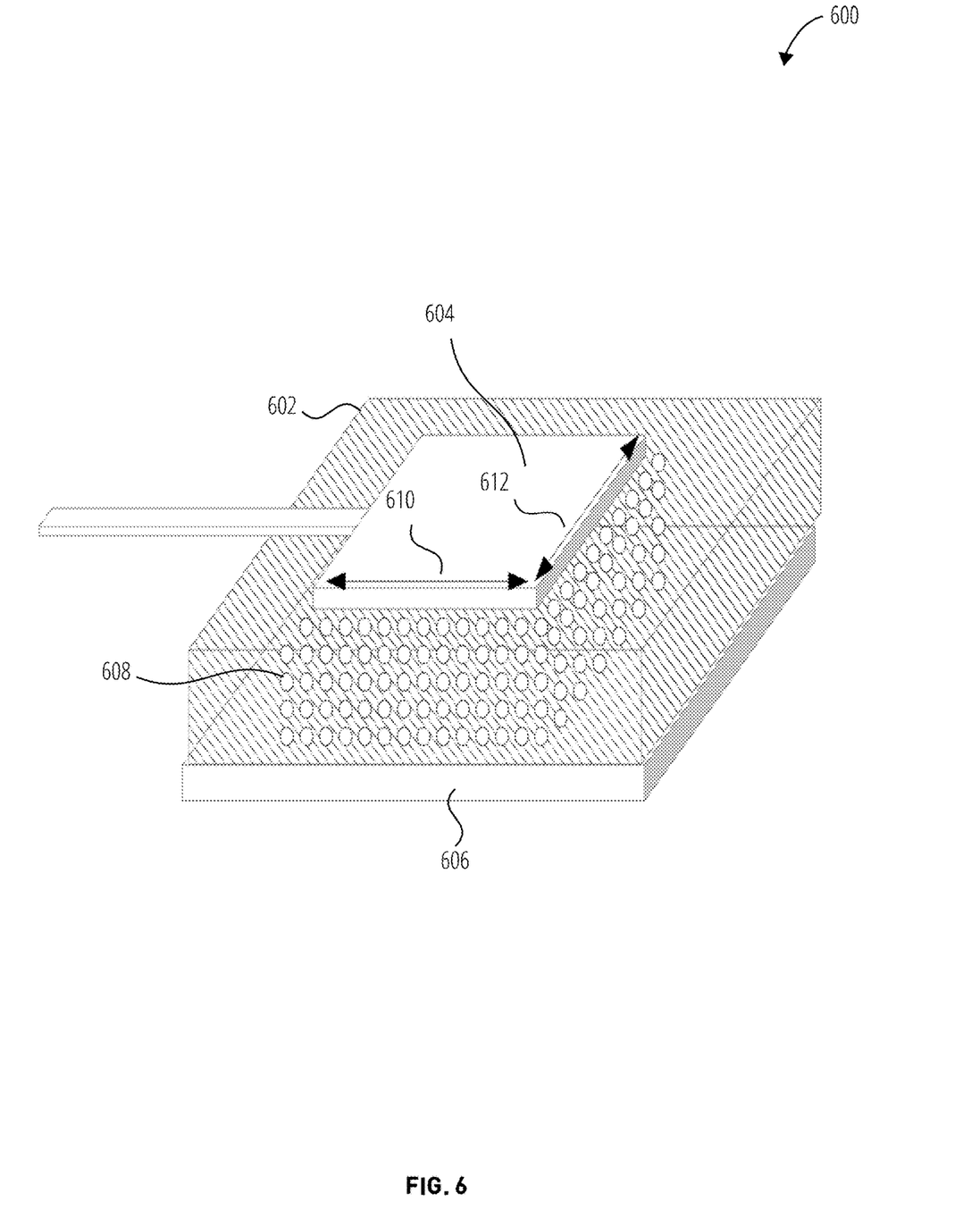
FIG. 6 illustrates a radio frequency element adjacent to a porous material according to an aspect of the present disclosure.

FIG. 6 illustrates a radio frequency element 604 adjacent to a porous material 602. The radio frequency element 604 may be the radio frequency element 304, and the porous material may be the porous material 310 of FIG. 3. In the arrangement 600, the porous material 602 is disposed underneath or adjacent to the radio frequency element 604. A bottom portion 606 may be a reference plane, such as a grounding plane of a printed circuit board. The dielectric fluid 608, illustrated as circles within the porous material 602, may be configured to change one or more radio frequency characteristics of the radio frequency element 604 by way of the dimensions of the radio frequency element 604. As shown in Equation 1 and Equation 2, the one or more radio frequency characteristics may depend on dimensions including length 610 and width 612 of the radio frequency element 604.

$$W = \frac{V_0}{2f_r}\sqrt{\frac{2}{D_k + 1}} \qquad \text{Eq. 1}$$

$$L = \frac{c}{2f_r\sqrt{D_k}} \qquad \text{Eq. 2}$$

As illustrated in the equations above, the dimensions including length 610 and width 612, as well as the dielectric properties can determine operating frequency of the radio frequency element 604.

Figure 7:
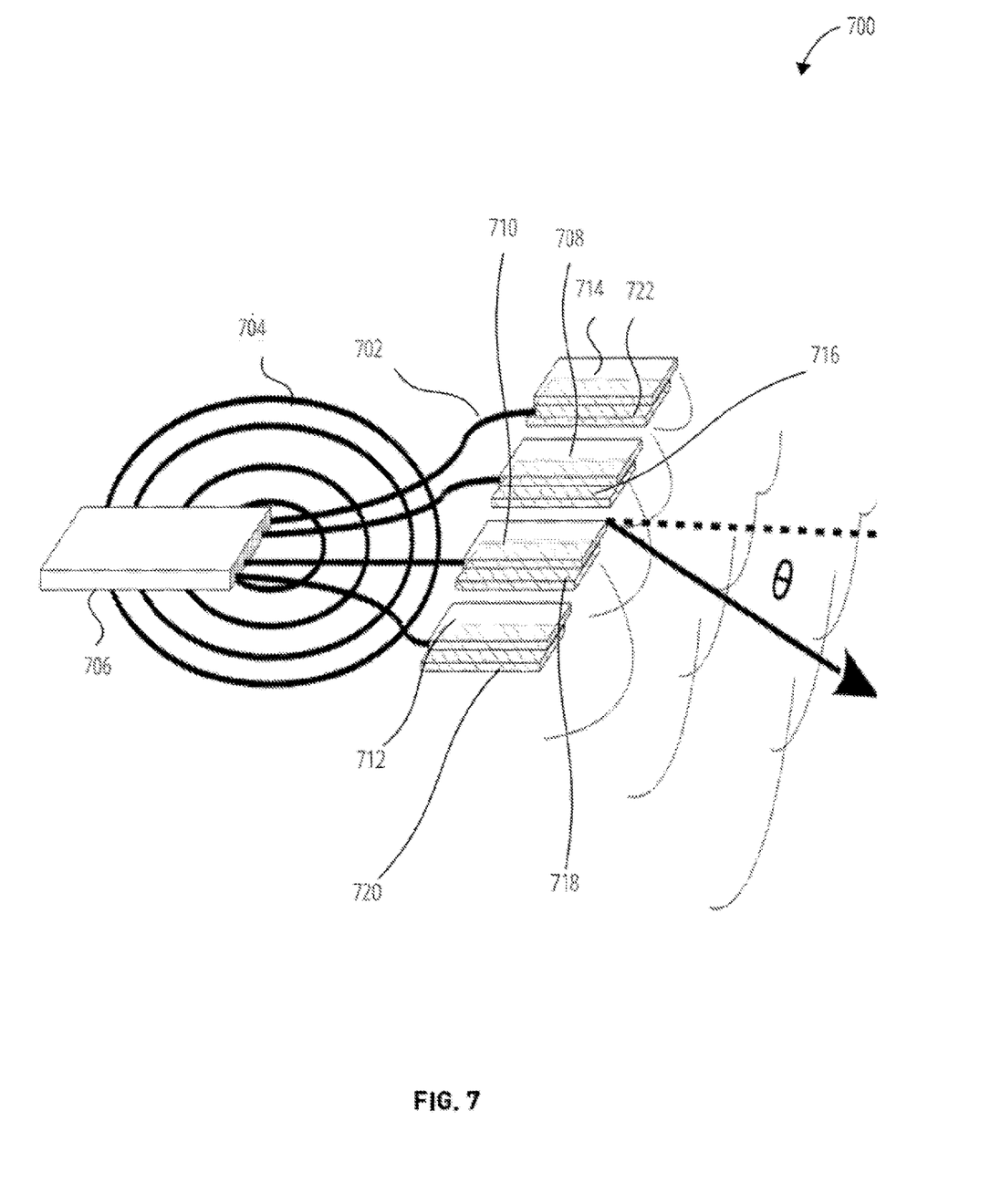
FIG. 7 illustrates one or more channels between a wireless charging coil and a radio frequency element array according to an aspect of the present disclosure.

FIG. 7 illustrates one or more channels 702 between a wireless charging coil 704 and a radio frequency element array 700. As discussed above in reference, to FIG. 3 wherein the one or more channels 306 are disposed between the wireless charging coil 302 and the radio frequency element 304, aspects described herein need not be limited to one radio frequency element. Therefore, as illustrated in FIG. 7, a radio frequency element array arrangement 700 may be used.

In some cases, phased arrays, such as the radio frequency element array arrangement 700 may use phase shifters to tune the radio frequency element array arrangement 700. However, in the present case, the dielectric fluid, such as dielectric fluid 608, can be used to tune the radio frequency element array arrangement 700. In FIG. 7, the radio frequency element array 700 may include a plurality of radio frequency elements 708, 710, 712, 714. These radio frequency elements 708, 710, 712, 714 may be the radio frequency element 304, porous materials 716, 718, 720, 722 may be the porous material 310 or porous material 602, the reservoir 706 may be the reservoir 308, wireless charging coil 704 may be the wireless charging wireless charging coil 302, and the one or more channels 702 may be the one or more channels 306 or one or more channels 702 discussed above.

However, in this case, the radio frequency elements 708, 710, 712, 714 may form a phased array, wherein changes in the presence of the dielectric fluid in the porous material 716, 718, 720, 722 may be used to control the one or more radio frequency characteristics of each radio frequency element 708, 710, 712, 714. For example, the dielectric fluid may be used to control the phase of each radio frequency element 708, 710, 710, 712 thereby forming a combined wavefront from individual wavefronts associated with each radio frequency element 708, 710, 712, 714. In this scenario, a phase shifter that may be associated with a phased array, such as the radio frequency element array arrangement 700 in FIG. 7, may be replaced by the porous material 716, the porous material 718, the porous material 720, and porous material 722. In FIG. 7, four separate channels may be used to move different volumes of fluid into the porous material 716, porous material 718, porous material 720, porous material 722, respectively. In some cases, the amount of dielectric fluid can be controlled by valves or individual cooling elements for each channel to control the thermomagnetic effect in each channel.

Figure 8:
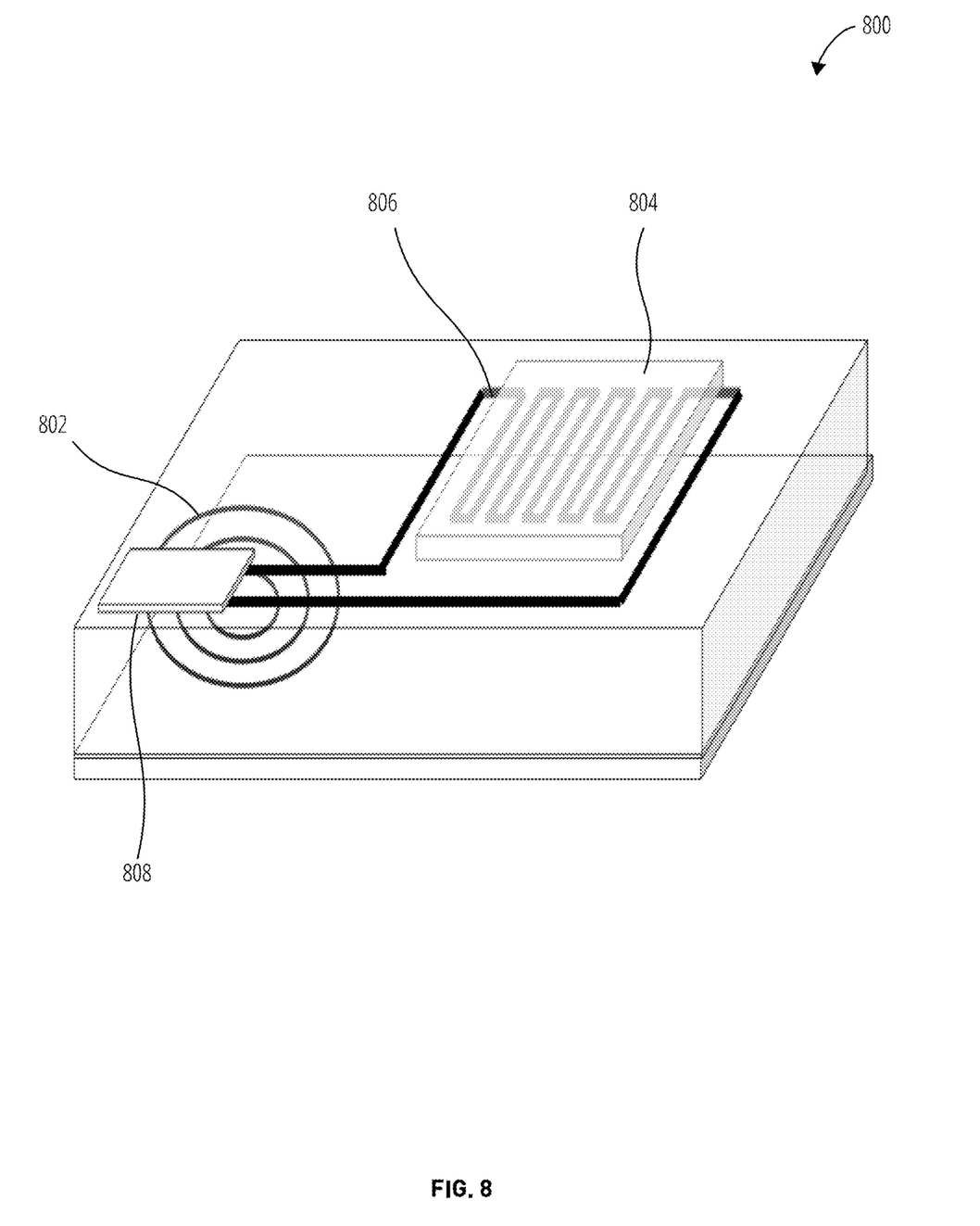
FIG. 8 illustrates one or more channels running adjacent to a radio frequency element according to an aspect of the present disclosure.

FIG. 8 illustrates an aspect 800 including one or more channels 802 running adjacent to a radio frequency element 804. Similar to the other figures, the one or more channels 802 may be the one or more channels 306 and one or more channels 702, the radio frequency element 804 may be the radio frequency element 304, radio frequency element 604, radio frequency element 708, radio frequency element 710, radio frequency element 712, radio frequency element 714, and so on. In this aspect, the porous material 310 is replaced with an arrangement of the one or more channels 802 underneath the radio frequency element 804 in an in a back and forth, interdigital, interweaving, or other like manner. This illustrates that the radio frequency element 804 characteristics may be changed based on the disposition of the one or more channels 802 adjacent to the radio frequency element 804, as well as the volume of dielectric fluid, such as the dielectric fluid 608, within the portion of the one or more channels 802 adjacent to the radio frequency element 804. In this case, a direct current, such as the direct current 400 of FIG. 4, or the direct current discussed in reference to other figures, when applied to the wireless charging coil 806 will initiate movement of the dielectric fluid from the reservoir 808 through the one or more channels 802. Based on the volume passing through the portion adjacent to the radio frequency element 804, one or more radio frequency characteristics of the radio frequency element 804 may be changed and/or tuned accordingly.

Figure 9:
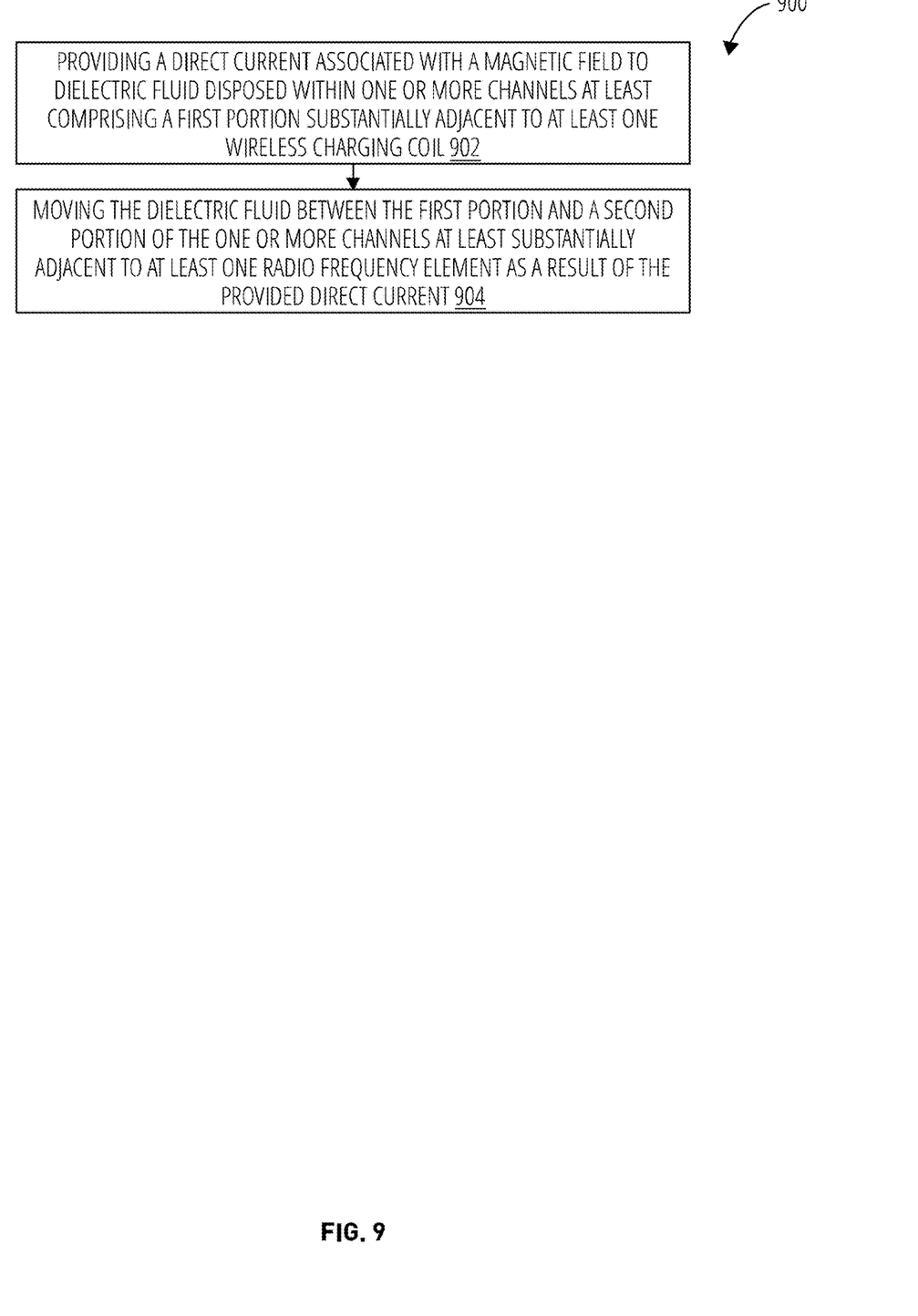
FIG. 9 illustrates a method 900 for moving dielectric fluid according to an aspect of the present disclosure.

FIG. 9 illustrates a method 900 for moving dielectric fluid. In block 902, method 900 provides a direct current associated with a magnetic field to dielectric fluid disposed within one or more channels at least comprising a first portion substantially adjacent to at least one wireless charging coil. In block 904, method 900 moves the dielectric fluid between the first portion and a second portion of the one or more channels at least substantially adjacent to at least one radio frequency element as a result of the provided direct current.

In some cases, providing a direct current associated with a magnetic field to dielectric fluid disposed within one or more channels at least comprising a first portion substantially adjacent to at least one wireless charging coil at block 902 is done by way of a processor, such as processor 206. For example, the direct current may be provided upon temperature detection indicating that heat dissipation would be beneficial to the operation of apparatus 200. As another example, signals associated with the antenna 210 and/or the transceiver 208 may indicate that tuning of the radio frequency element, such as one or more of the radio frequency elements 304, 604, 708, 710, 712, 714 may benefit from tuning. In this case, the direct current may be provided in a magnitude associated with a desired tuning of the one or more radio frequency elements 304, 604, 708, 710, 712, 714. Some examples of environments wherein tuning of the one or more radio frequency elements 304, 604, 708, 710, 712, 714 may include hand position of a user of the apparatus 200, speed of travel of the apparatus 200, interference on a channel associated with the antenna 210 and/or transceiver 208, traffic associated with a radio frequency channel, and the like.

In view of the above, aspects of the present disclosure may provide several advantages, technical improvements and/or technical effects. For example, certain aspects improve the functioning of user equipment (UEs), such as smart phones and wearable devices, by making these devices more intuitive and allowing the devices to learn daily habits of users in order to provide feedback or output that is less intrusive and more beneficial to users. As such, aspects of the present disclosure can improve the performance of network nodes including, for example, UEs, mobile devices, smart phones, wearable devices, network servers, base stations, eNBs, etc. Accordingly, the use of aspects of the present disclosure results in improved functioning of communications networks and their nodes.

In some aspects, the functionality of any of the methods, processes, signaling diagrams, or flow charts described herein may be implemented by software and/or computer program code or portions of code stored in memory or other computer readable or tangible media, and executed by a processor.

In certain aspects, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may comprise one or more computer-executable components which, when the program is run, are configured to carry out certain aspects. The one or more computer-executable components may include software code or portions of it. Modifications and configurations required for implementing the functionality of an aspect may be performed as routine(s), which may be implemented as added or updated software routine(s). In certain aspects, software routine(s) may be downloaded into an apparatus.

Software or computer program code or portions of code may be in a source code form, object code form, or in some intermediate form, and may be stored in some type of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other aspects, the functionality of any method or process described herein may be performed by hardware, for example through the use of an application specific integrated circuit (ASIC), a programmable gate array (PGA), a field programmable gate array (FPGA), or any other combination of hardware and software. In yet another aspect, the functionality may be implemented as a signal, a non-tangible means that can be carried by an electromagnetic signal downloaded from the Internet or other network.

According to an aspect, an apparatus, such as a node, device, or a corresponding component, may be configured as a computer or a microprocessor, such as single-chip computer element, or as a chipset, including at least a memory for providing storage capacity used for arithmetic operations and an operation processor for executing the arithmetic operations.

One having ordinary skill in the art will readily understand that the present disclosure as discussed above may be practiced with steps in a different order, and/or with hardware elements in configurations which are different than those which are disclosed. Therefore, although the present disclosure has been described based upon these preferred aspects, it would be apparent to those of skill in the art that certain modifications, variations, and alternative constructions would be apparent, while remaining within the spirit and scope of the present disclosure. In order to determine the metes and bounds of the present disclosure, therefore, reference should be made to the appended claims.

What is claimed is:

1. An apparatus, comprising:
   at least one radio frequency element;
   at least one wireless charging coil;
   one or more channels disposed between the at least one wireless charging coil and the at least one radio frequency element, wherein a first portion of a respective channel of the one or more channels is at least substantially adjacent to the at least one wireless charging coil and a second portion of a respective channel of the one or more channels is at least substantially adjacent to the at least one radio frequency element;
   a dielectric fluid disposed within the one or more channels; and
   a processor configured to cause:
   triggering a change of magnitude of a magnetic field associated with at least one transmitting coil to initiate movement of the dielectric fluid during wireless charging of the apparatus and leaving the direction of the magnetic field associated with the at least one transmitting coil substantially unchanged.

2. The apparatus of claim 1, wherein the processor is further configured to cause:
   triggering provision of a direct current on the at least one wireless charging coil.

3. The apparatus of claim 2, wherein provision of the direct current on the at least one wireless charging coil is configured to initiate movement of the dielectric fluid in the one or more channels between the first portion and the second portion.

4. The apparatus of claim 3, wherein the movement of the dielectric fluid between the first portion and the second portion is configured to change one or more radio frequency characteristics of the at least one radio frequency element.

5. The apparatus of claim 4, wherein the change of one or more radio frequency characteristics is configured to tune the at least one radio frequency element.

6. The apparatus of claim 1, wherein the first portion comprises a reservoir configured to dispose the dielectric fluid.

7. The apparatus of claim 1, wherein the one or more channels are configured to dissipate heat via movement of the dielectric fluid through the one or more channels between the first portion and the second portion.

8. The apparatus of claim 1, further comprising a radio frequency element array, wherein the at least one radio frequency element is one of a plurality of radio frequency elements in the radio frequency element array.

9. The apparatus of claim 1, wherein the second portion comprises a porous material substantially adjacent to the at least one radio frequency element configured to receive the dielectric fluid.

* * * * *